(12) United States Patent
Cheung (10) Patent No.: US 8,931,785 B1
(45) Date of Patent: Jan. 13, 2015

(54) STEERABLE SLED BOARD AND THE LIKE

(71) Applicant: Loi Hui Cheung, Hong Kong (CN)

(72) Inventor: Loi Hui Cheung, Hong Kong (CN)

( * ) Notice: Subject to any disclaimer, the term of this patent is extended or adjusted under 35 U.S.C. 154(b) by 0 days.

(21) Appl. No.: 13/987,056

(22) Filed: Jun. 28, 2013

(51) Int. Cl.
*B62B 15/00* (2006.01)
*B62B 13/00* (2006.01)
*B62B 17/06* (2006.01)

(52) U.S. Cl.
CPC ............. *B62B 13/005* (2013.01); *B62B 17/061* (2013.01)
USPC ............................................. 280/16; 280/17

(58) Field of Classification Search
USPC ..................................................... 280/15–17
See application file for complete search history.

(56) References Cited

U.S. PATENT DOCUMENTS 4,193,608 A * 3/1980 Gunderson ....................... 280/8
2005/0212230 A1 * 9/2005 Krent ............................. 280/15

* cited by examiner

*Primary Examiner* — Jeffrey J Restifo
*Assistant Examiner* — Erez Gurari
(74) *Attorney, Agent, or Firm* — Raymond Y. Chan; David and Raymond Patent Firm (57) ABSTRACT

A steering sled board includes a supporting board for supporting a center of mass of a rider and a steering control which includes a steering board aligned with and movably coupled in front the supporting board in an inline manner, wherein the steering board is self-rotatable with respect to the supporting board and is arranged in such a manner that when the steering board is controllably shifted at a rotatable angle, said supporting board is correspondingly turned at a steering angle.

7 Claims, 10 Drawing Sheets

STEERABLE SLED BOARD AND THE LIKE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a snowboard, and more particular to a steerable sled board, wherein the rider is able to control the sledding route of the sled board in the downhill direction.

2. Description of Related Arts

Snow sports are considered as one of the most popular outdoor activities throughout the world. Generally speaking, there are two types of snow sports, which are skiing and sledding. Accordingly, skiing, including snowboarding and traditional skiing, requires the skier standing on the snowboard or skiing boards with foot bindings at the player's boots. In order to control the speed and direction during skiing, the skier must stand in a dynamic stance with the body weight forward to keep the balance of the skiing movement and shift the body weight to make a turn or slow down the speed.

Sledding, similar to sliding, requires the rider lying down in a prone or seated position. Therefore, the body center of gravity is lowered during sledding to make the sled board more stable and to increase the sledding speed. Similar to skiing technique, the rider is able to shift the body weight in order to make a turn or slow down the speed. Or, the rider may simply drag his or her boots in the snow for making a turn or for deceleration. Since the body center of gravity is lowered during sledding, the rider is hard to steer the sled board by shifting the body weight of the rider. Especially during the high speed sledding movement, a slightly shift of the body weight will make an uncontrollable sharp turn, or even flip over the sled board.

SUMMARY OF THE PRESENT INVENTION

The invention is advantageous in that it provides a steerable sled board, wherein the rider is able to control the sledding route of the sled board in the downhill direction.

Another advantage of the invention is to provide a steerable sled board, wherein the rider is able to make a turn by simply rotating a steering board while sitting on a supporting board.

Another advantage of the invention is to provide a steerable sled board, wherein the steering board provides increased control of the maneuverability by means of rider's foot operation or hand operation.

Another advantage of the invention is to provide a steerable sled board, wherein the steering angle of the supporting board is controlled by the rotation angle of the steering board, such that the rider is able to precisely control the turning of the sled board.

Another advantage of the invention is to provide a steerable sled board, wherein no expensive or complicated structure is required to employ in the present invention in order to achieve the above mentioned objects. Therefore, the present invention successfully provides an economic and efficient solution for providing a steering configuration for the sled board and for enhancing the control of the sled board.

Additional advantages and features of the invention will become apparent from the description which follows, and may be realized by means of the instrumentalities and combinations particular point out in the appended claims.

According to the present invention, the foregoing and other objects and advantages are attained by a steering sled board which comprises a supporting board for supporting a center of mass of a rider and a steering control. The steering control comprises a steering board aligned with and movably coupled in front the supporting board in an inline manner, wherein the steering board is self-rotatable with respect to the supporting board and is arranged in such a manner that when the steering board is controllably shifted at a rotatable angle, said supporting board is correspondingly turned at a steering angle.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
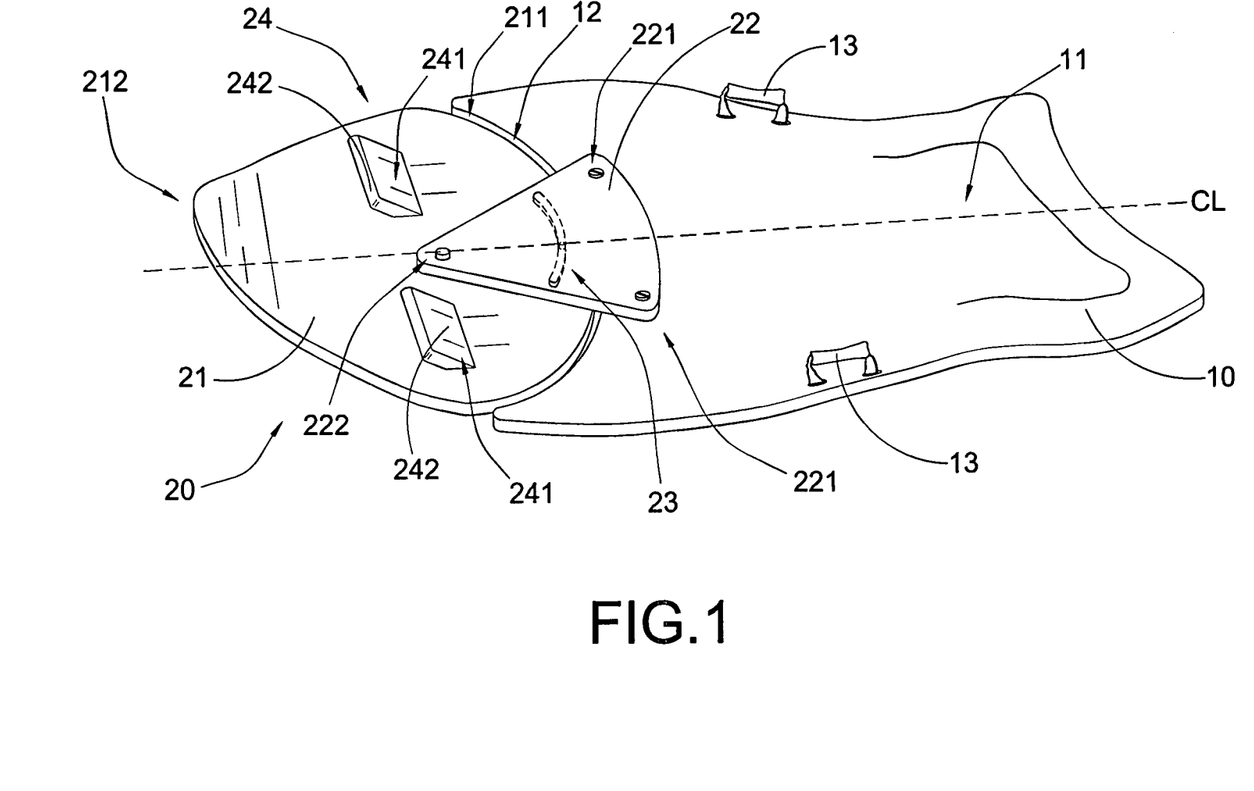
FIG. 1 is a perspective view of a steerable sled board according to a preferred embodiment of the present invention.

Referring to FIG. 1 of the drawings, a steerable sled board for a rider riding thereon is illustrated, wherein the steerable sled board can be slid easily through snow or over other surfaces. Accordingly, the steerable sled board comprises a supporting board 10 and a steering control 20.

The supporting board 10 is arranged for supporting a center of mass of the rider. Preferably, the supporting board 10 has a seated portion 11 indented on a top side of the supporting board 10 for allowing the rider sitting on or lying at the supporting board 10, such that the center of mass of the rider will be located at the supporting board 10. The supporting further comprises two handle frames 13 provided at two sides of the supporting board 10, such that the rider is able to sit at the seated portion 11 and to grip at the handle frames 13 for keeping the body of the rider in balance and for stably sledding in the downhill direction. In addition, the supporting board 10 further defines a centerline CL in its longitudinal direction, wherein the center of mass of the rider should be located at the centerline CL of the supporting board 10 in a balancing manner. Accordingly, the supporting board 10 can be made of lightweight but durable material which can be a foaming material such as EPS or EPE, or injection material such as PVC, ABS, HDPE, etc. . . .

The steering control 20 comprises a steering board 21 aligned with and movably coupled in front the supporting board 10 in an inline manner, wherein the steering board 21 is self-rotatable with respect to the supporting board 10. Therefore, when the steering board 21 is controllably shifted at a rotatable angle A, the supporting board 10 is correspondingly turned at a steering angle. In other words, when the steering board 21 is rotated at the rotatable angle A in a clockwise direction, the supporting board 10 will turn in the right direction. Likewise, when the steering board 21 is rotated at the rotatable angle A in a counter clockwise direction, the supporting board 10 will turn in the left direction. It is worth mentioning that when the rotatable angle A is increased, the steering angle, i.e. the turning angle, will be correspondingly increased.

As shown in FIGS. 1 to 6, the supporting board 10 has a convex front edge 12. Correspondingly, the steering board 21 has a concave rear edge 211 spacedly aligned with the convex front edge 12 of the supporting board 10 to minimize a gap between the supporting board 10 and the steering board 21. For example, when sledding on a snow surface, snow may be dragged through the gap between the front edge of the supporting board 10 and the rear edge of the steering board 21. Therefore, the convex-concave configuration will minimize the gap between to minimize the snow being dragged therethrough.

The steering board 21 further comprises a front pointing end 212 aligned along the centerline CL of the supporting board 10 to indicate the steering board 21 at the original center position. It is worth mentioning that when the front pointing end 212 of the steering board 21 points forward along the centerline CL of the supporting board 10, the supporting board 10 will be sledded in a straight forwarding direction. When the steering board 21 is rotated in the clockwise direction, the front pointing end 212 of the steering board 21 will point to the right such that the supporting board 10 is controlled for making a right turn. When the steering board 21 is rotated in the counter clockwise direction, the front pointing end 212 of the steering board 21 will point to the left such that the supporting board 10 is controlled for making a left turn.

According to the preferred embodiment, the steerable sled board further comprises a sledding arrangement 30 for improving the sledding performance. The sledding arrangement 30 comprises a plurality of elongated sledding grooves 31 spacedly formed at a bottom side of the supporting board 10 and a plurality of elongated steering grooves 32 spacedly formed at a bottom side of the steering board 21.

The sledding grooves 31 are parallelly extended from the front of the supporting board 10 to the rear thereof in the longitudinal direction of the supporting board 10 such that the sledding grooves 31 are parallelly aligned with the centerline CL of the supporting boar 10. Accordingly, each of the sledding grooves 31 has a predetermined depth indented on the bottom side of the supporting board 10.

The steering grooves 32 are spacedly formed at the bottom side of the steering board 21 and are arranged to align with the sledding grooves 31 end-to-end respectively. In particular, the steering grooves 32 are identical to the sledding grooves 31, wherein a depth and width of each of the steering grooves 32 are the same as the depth and width of each of the sledding grooves 31.

Figure 2:
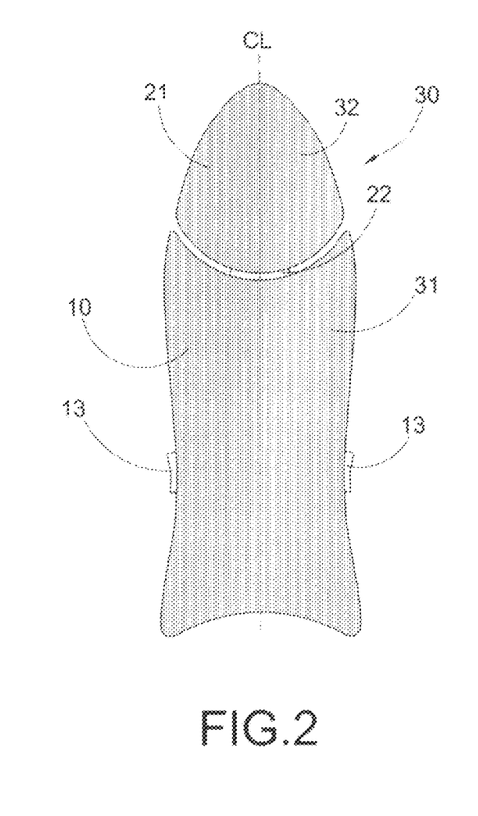
FIG. 2 is a bottom view of the steerable sled board according to the above preferred embodiment of the present invention, illustrating the alignment of the sledding grooves and the steering grooves.

As shown in FIG. 2, a groove interval between every two of sledding grooves 31 is the same as a groove interval between every two of the steering grooves 32. In other words, the groove spacing of the sledding grooves 31 is the same as the groove spacing of the steering groove 32.

Figure 2A:
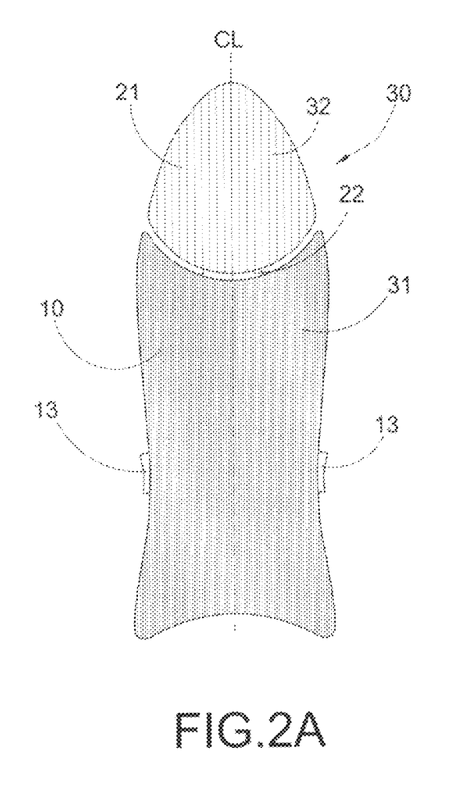
FIG. 2A illustrates a first alternative mode of the sledding grooves and the steering grooves according to the above preferred embodiment of the present invention.
Figure 2B:
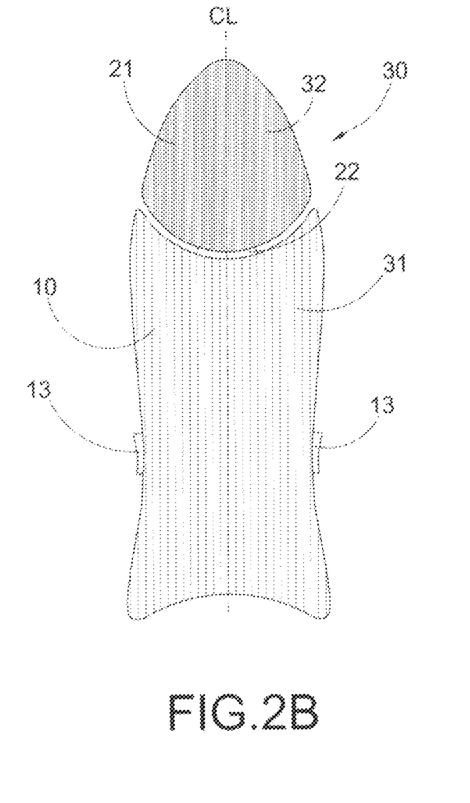
FIG. 2B illustrates a second alternative mode of the sledding grooves and the steering grooves according to the above preferred embodiment of the present invention

For controlling the speed of the sledding performance, the groove spacing at the steering board 21 can be different from the groove spacing at the supporting board 10. As shown in FIG. 2A, the groove interval between every two of sledding grooves 31 is smaller a groove interval between every two of the steering grooves 32. In other words, the groove spacing of the sledding grooves 31 is smaller the groove spacing of the steering groove 32. As shown in FIG. 2B, the groove interval between every two of sledding grooves 31 is larger a groove interval between every two of the steering grooves 32. In other words, the groove spacing of the sledding grooves 31 is larger the groove spacing of the steering groove 32.

Figure 4:
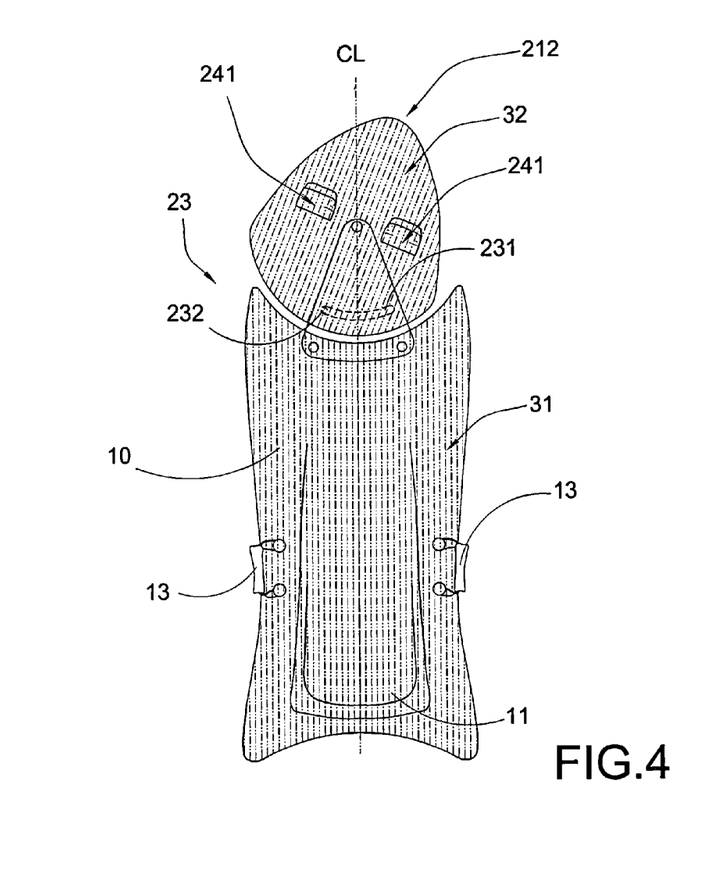
FIG. 4 is an exploded perspective view of the steerable sled board according to the above preferred embodiment of the present invention, illustrating the guiding unit of the steering unit.
Figure 5:
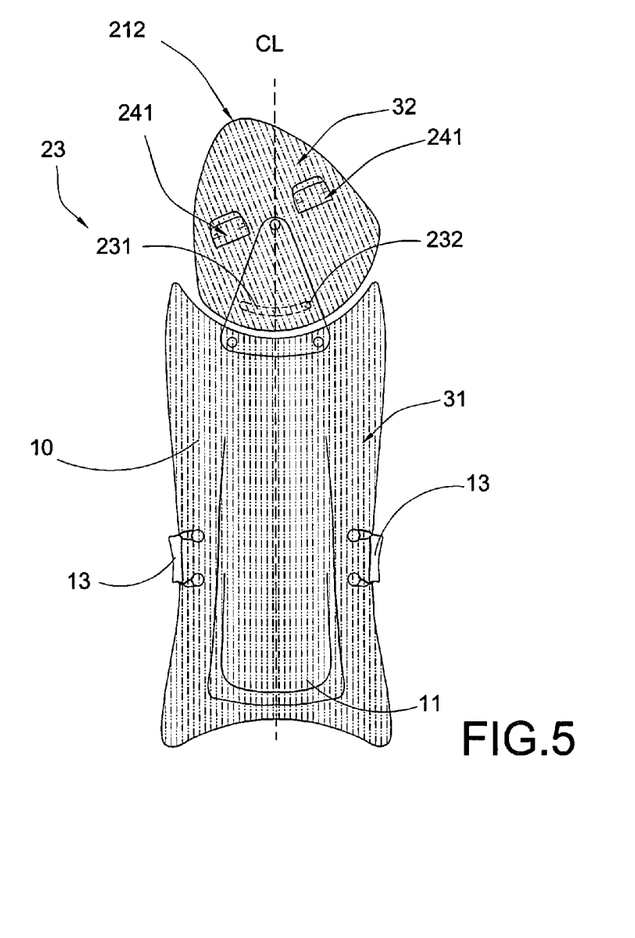
FIG. 5 illustrates the steering board being rotated at one direction to misalign the steering grooves with the sledding grooves while the rotational movement of the steering board is guided and limited by the guiding unit.

When the steering grooves 32 are aligned with the sledding grooves 31, the supporting board 10 is controlled for sledding in a straight forwarding direction. In other words, the steering board 21 is remained at the original center position, the supporting board 10 will be sledded in a straight forwarding direction. The original center position of the steering board 21 is the position that the steering board 21 is not rotate neither in clockwise nor counter clockwise direction. When the steering board 21 is rotated to misalign the steering grooves 32 with the sledding grooves 31, the supporting board 10 is controlled for making a turn. In particular, when the steering board 21 is rotated in the clockwise direction, the steering grooves 32 are moved in an inclined direction (to the right side) with respect to the sledding grooves 31, as shown in FIG. 4. As a result, the supporting board 10 is controlled for making a right turn. Likewise, when the steering board 21 is rotated in the counter clockwise direction, the steering grooves 32 are moved in an inclined direction (to the left side) with respect to the sledding grooves 31, as shown in FIG. 5. As a result, the supporting board 10 is controlled for making a left turn. It is worth mentioning that the rotatable angle of the steering board 21 can be defined as an inclination angle between the steering groove 32 and the sledding groove 31.

According to the preferred embodiment, the steering control 20 further comprises a connection link 22 coupled the steering board 21 with the supporting board 10 to enable the steering board 21 to be self-rotated with respect to the supporting board 10. As shown in FIGS. 1 and 4, the connection link 22 has a triangular shape defining a front corner and two rear corners.

The connection link 22 comprises at least a rear affixing end 221 coupled at a front portion of the supporting board 10 and a front affixing end 222 rotatably coupled at the center of the steering board 21 to enable the steering broad 21 to be self-rotated at the center thereof. It is worth mentioning that the center of the steering board 21 is aligned along the centerline CL of the supporting board 10.

Figure 6:
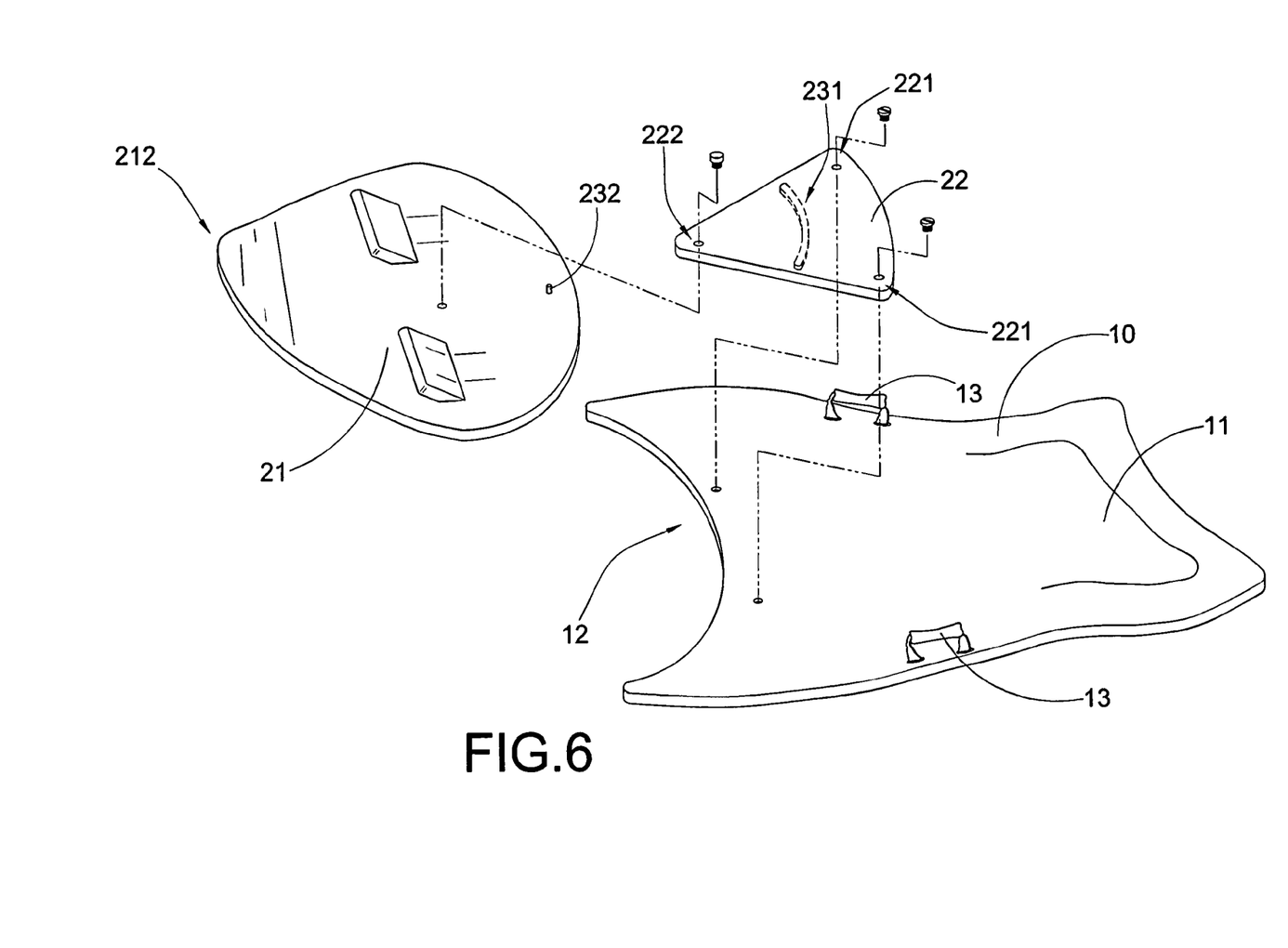
FIG. 6 illustrates the steering board being rotated at an opposed direction to misalign the steering grooves with the sledding grooves while the rotational movement of the steering board is guided and limited by the guiding unit.

As shown in FIGS. 5 and 6, the rear affixing end 221 of the connection link 22 is defined at each of the rear corners thereof. Therefore, when the rear affixing ends 221 of the connection link 22 are affixed to the front portion of the supporting board 10 at the top side thereof, the connection link 22 is immovably affixed and frontwardly extended at the supporting board 10. The front affixing end 222 of the connection link 22 is defined at the front corner thereof, wherein the front affixing end 222 of the connection link 22 is coupled at the center of the steering board 21 via a rotatable joint which also forms a rotatable shaft to enable the rotational movement of the steering board 21. It is worth mentioning that the triangular shaped connection link 22 is preferably an isosceles triangle.

According to the preferred embodiment, the steering control 20 further comprises a guiding unit 23 for guiding the rotational movement of the steering board 21 and for limiting the rotational movement thereof so as to prevent the overturning of the supporting board 10.

As shown in FIGS. 4 to 6, the guiding unit 23 has an arc-shaped guiding slot 231 indented at a bottom side of the connection link 22 and comprises a limiting guider 232 which is upwardly protruded from the top side of the steering board 21 and is slidably engaged with the guiding slot 231. The curvature of the guiding slot 231 matches with the arc of the steering board 21 to guide the rotational movement of the steering board 21 by the curvature of the guiding slot 231. The guiding slot 231 further has a predetermined arc length to define two ends thereof, wherein the limiting guider 232 is slid along the guiding slot 231 between the two ends thereof to limit the rotational movement between two ends of the guiding slot 231. In other words, when the steering board 21 is rotated in the clockwise direction, the limiting guider 232 is arranged to slide along the guiding slot 231 and is blocked by one of the ends of the guiding slot 231 so as to block the further rotational movement of the steering board 21 in the clockwise direction. Likewise, when the steering board 21 is rotated in the counter clockwise direction, the limiting guider 232 is arranged to slide along the guiding slot 231 and is blocked by the other end of the guiding slot 231 so as to block the further rotational movement of the steering board 21 in the counter clockwise direction. It is worth mentioning that when the steering board 21 is over-rotated, the supporting board 10 will be forced to make a sharp turn which may flip the supporting board 10 over.

It is appreciated that the guiding slot 231 can be indented and formed at the top side of the steering board 21 while the limiting guider 232 can be downwardly protruded from the bottom side of the connection link 22 in order to slidably engage with the guiding slot 231.

Figure 3:
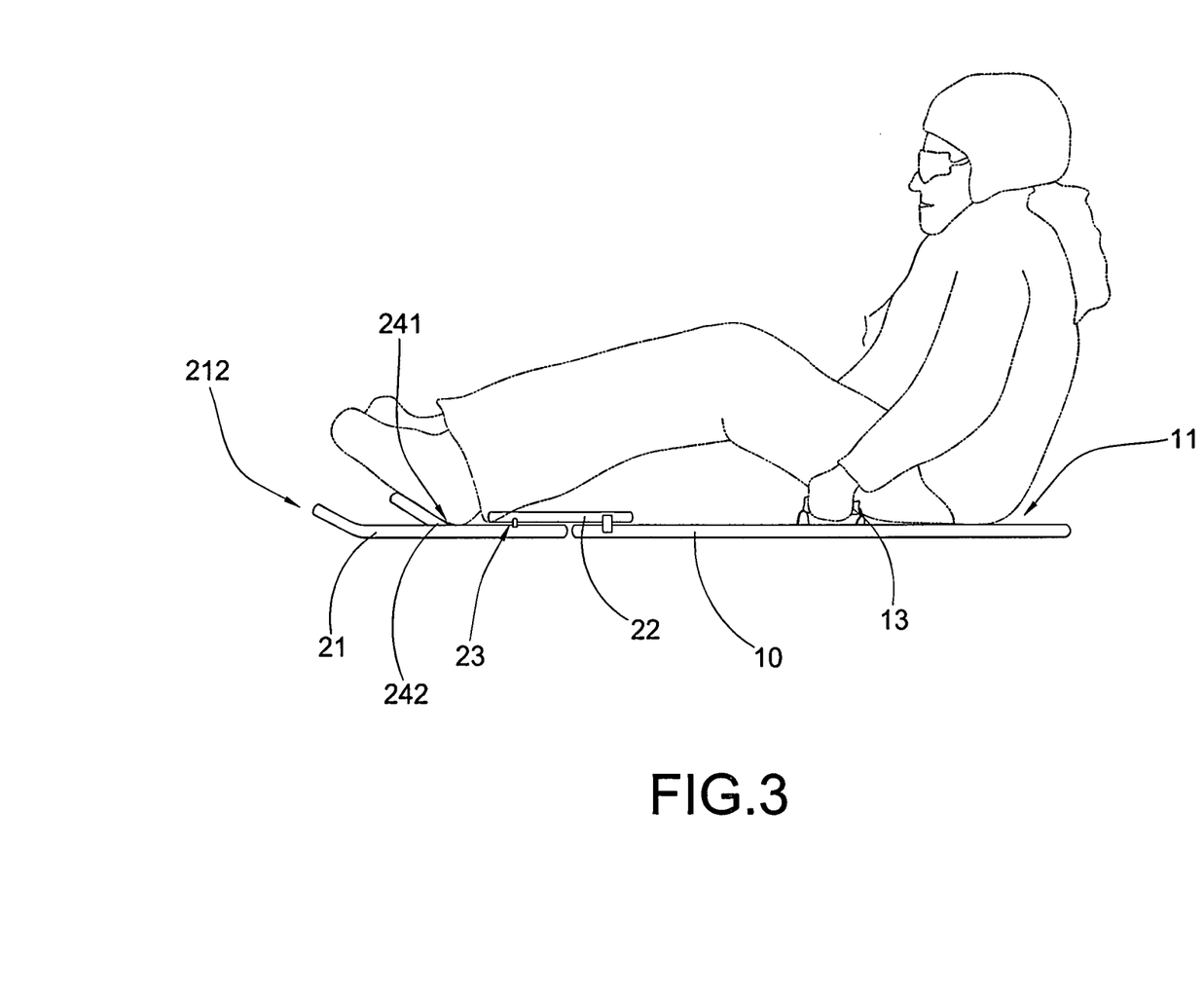
FIG. 3 is a sectional view of the steerable sled board according to the above preferred embodiment of the present invention, illustrating the rider sitting at the sled board.

As shown in FIGS. 1 and 3, the rider is able to sit at the seated portion 11 of the supporting board 10, wherein the feet of the rider can extend and rest at the steering board 21. Preferably, the rider is able to rotate the steering board 21 by foot operation. Accordingly, the steering control 20 further comprises an operation unit for controllably operating the rotational movement of the steering board 21. The operation unit comprises two foot pedals 24 spacedly provided at the top side of the steering board 21 to rotate the steering board 21 by foot operation. The foot pedals 24 comprises two heel steps 241 (left heel step and right heel step) upwardly protruded from the top side of the steering board 21 and defined two pushing surfaces 242 (left pushing surface and right pushing surface), wherein the heels of the rider can rest at the heel steps 241 respectively. Therefore, when the left foot of the rider pushes forwards at the left pushing surface 242, the steering board 21 will be rotated in a clockwise direction. When the right foot of the rider pushes forwards at the right pushing surface 242, the steering board 21 will be rotated in a counter clockwise direction. It is appreciated that the foot pedals 24 can be two pedal cavities (left pedal cavity and right pedal cavity) indent from the top side of the steering board 21 to define the pushing surfaces thereat, wherein the heels of the rider can rest at the heel cavities. When one of the pedal cavities is pushed by the foot of the rider, the steering board 21 is controlled to make a corresponding turn.

The rider is able to control the sled board of the present invention to sled at different sledding routes. For example, when making a right turn, the rider is able to push the left pushing surface 242 to rotate the steering board 21 in a clockwise direction. Then, by pushing the right pushing surface 242 to rotate the steering board 21 in a counter clockwise direction, the steering board 21 will be returned back to its original center position, such that the supporting board 10 will be sledded in a straight forwarding direction. The rider is able to sled in a zigzag sledding route by reciprocatingly pushing the left and right pushing surfaces 242 in order to reciprocatingly rotate the steering board 21 in clockwise and counter clockwise directions.

Figure 3A:
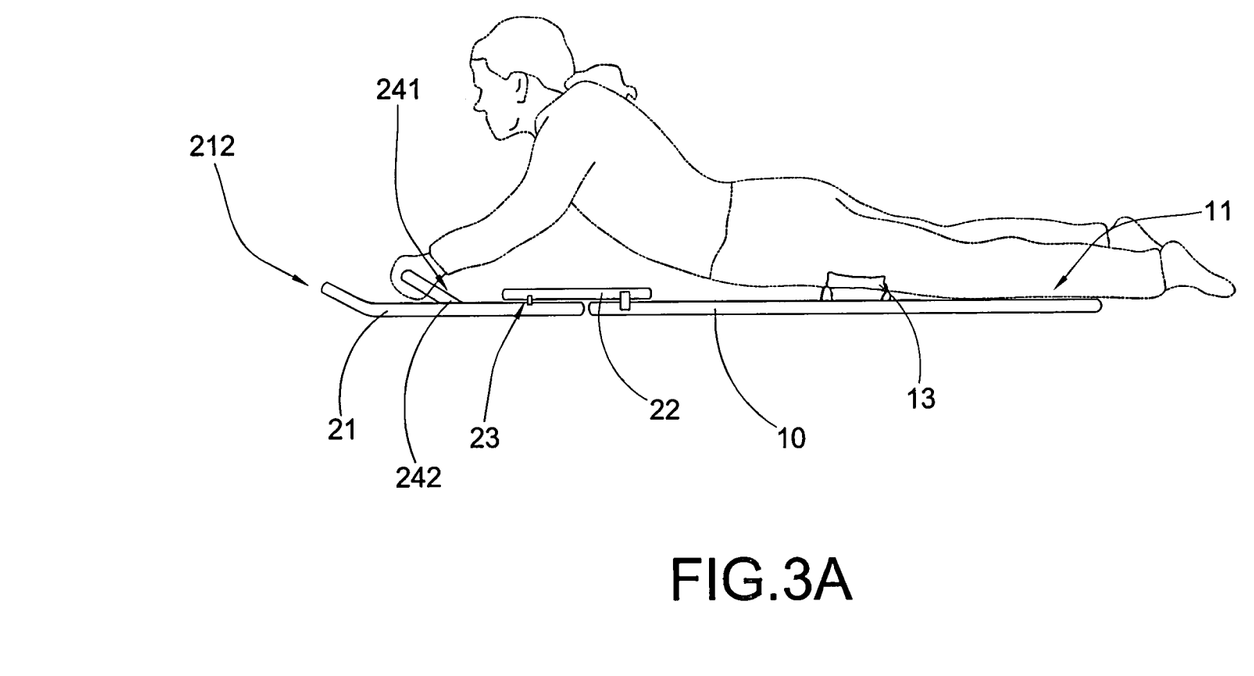
FIG. 3A is a sectional view of the steerable sled board according to the above preferred embodiment of the present invention, illustrating the rider lying at the sled board.

As shown in FIG. 3A, the rider is able to lie on the supporting board 10, wherein the hand of the rider can extend to the steering board 21. Preferably, the rider is able to rotate the steering board 21 by hand operation. The hands of the rider can grip at the heel steps 241 respectively. Therefore, when the left hand of the rider pushes forwards at the left pushing surface 242, the steering board 21 will be rotated in a clockwise direction. When the right hand of the rider pushes forwards at the right pushing surface 242, the steering board 21 will be rotated in a counter clockwise direction.

Figure 7:
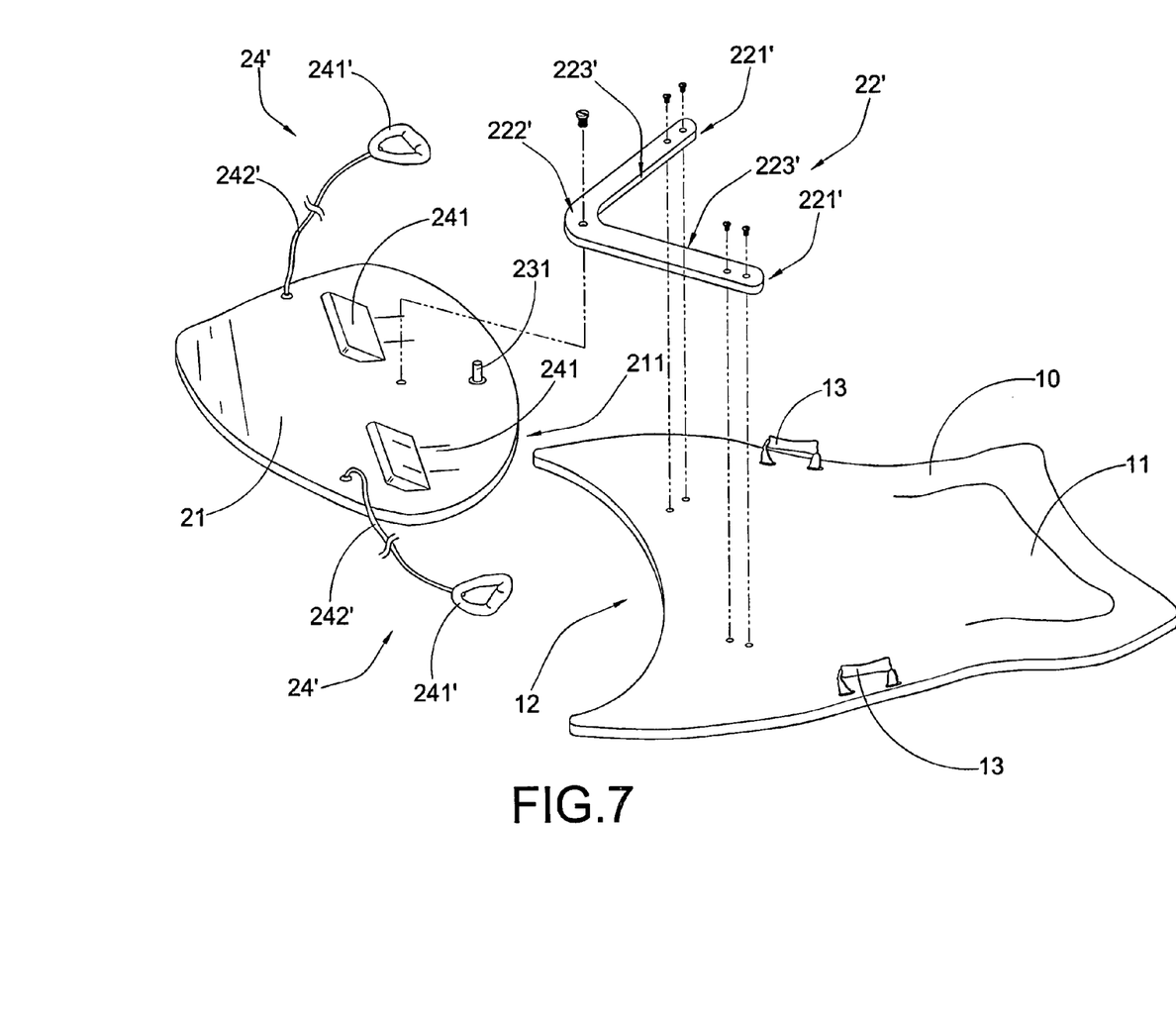
FIG. 7 illustrates an alternative mode of the steerable sled board according to the above preferred embodiment of the present invention.

FIG. 7 illustrates an alternative mode of the sled board according to the above preferred embodiment, wherein the structural configuration of the sled board is the same as the preferred embodiment, expect the connection link 22' and the operation unit.

As shown in FIG. 7, the connection link 22' has a V-shape defining a front vertex end and two rear free ends. The rear affixing end 221' of the connection link 22' is defined at each of the rear free ends thereof. Therefore, when the rear affixing ends 221' of the connection link 22' are affixed to the front portion of the supporting board 10 at the top side thereof, the connection link 22' is immovably affixed and frontwardly extended at the supporting board 10. The front affixing end 222' of the connection link 22' is defined at the front vertex end thereof, wherein the front affixing end 222' of the connection link 22' is coupled at the center of the steering board 21 via a rotatable joint which also forms a rotatable shaft to enable the rotational movement of the steering board 21.

It is worth mentioning that the limiting guider 232 is upwardly protruded from the top side of the steering board 21 and is located between two inner edges 223' of the V-shaped connection link 22'. Therefore, the two inner edges 223' of the connection link 22' function as the two ends of the guiding slot 221 of the above embodiment to block the limiting guider 232 and to limit the rotational movement of the steering board 21. In other words, when the steering board 21 is rotated in the clockwise direction, the limiting guider 232 is blocked by one of the inner edges 223' of the connection link 22' so as to block the further rotational movement of the steering board 21 in the clockwise direction. Likewise, when the steering board 21 is rotated in the counter clockwise direction, the limiting guider 232 is blocked by the other inner edge 223' of the connection link 22' so as to block the further rotational movement of the steering board 21 in the counter clockwise direction.

As shown in FIG. 7, the operation unit comprises two controlling handles 24' extended from the steering board 21 for being gripped by the rider's hands to rotate the steering board 21 by hand operation. Each of the controlling handles 24' comprises a hand grip 241' and an elongated cable 242' having one end affixing to the steering board 21 and an opposed end affixing to the hand grip 241'. Therefore, the rider is able to grip the hand grips 241' by two hands to operate the rotation of the steering board 21. When the hand grip 241' is pulled by the right hand of the rider, the steering board 21 will be rotated in the clockwise direction such that the supporting board 10 is controlled to make a right turn. When the hand grip 241' is pulled by the left hand of the rider, the steering board 21 will be rotated in the counter clockwise direction such that the supporting board 10 is controlled to make a left turn. It is appreciated that the elongated cable 242' is a length-adjustable cable such that the rider is able to adjust the length of the elongated cable 242' to adjust the hand grip 241' with a hand-reachable distance. Furthermore, the two heel steps 241 can be formed as two heel rests for the feet of the rider resting thereat respectively.

It should be appreciated that the steerable sled board of the present invention incorporates with a motorized propeller mounted at the supporting board 21 for propelling the supporting board 21 forward on a flat surface such that the rider is able to steer the steerable sled board via the steering control 22.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A sled board, comprising:
a supporting board for supporting a center of mass of a rider; and
a steering control which comprises:
a steering board aligned with and movably coupled in front said supporting board in an inline manner;
a connection link coupled said steering board with said supporting board to enable said steering board to be self-rotated with respect to said supporting board, wherein said steering board is arranged in such a manner that when said steering board is controllably shifted at a rotatable angle, said supporting board is correspondingly turned at a steering angle; and,
a guiding unit for guiding a rotational movement of said steering board, wherein said guiding unit has an arc-shaped guiding slot indented at a bottom side of said connection link and comprises a limiting guider which is upwardly protruded from a top side of said steering board and is slidably engaged with said guiding slot to guide said rotational movement of said steering board by a curvature of said guiding slot and to limit said rotational movement between two ends of said guiding slot.

2. The sled board, as recited in claim 1, further comprising a plurality of elongated sledding grooves spacedly formed at a bottom side of said supporting board to parallelly align with a centerline thereof, and a plurality of elongated steering grooves spacedly formed at a bottom side of said steering board, in such a manner that when said steering grooves are aligned with said sledding grooves, said supporting board is controlled for sledding in a straight forwarding direction, and when said steering board is rotated to misalign said steering grooves with said sledding grooves, said supporting board is controlled for making a turn.

3. The sled board, as recited in claim 2, wherein said connection link comprises at least a rear affixing end coupled at a front portion of said supporting board and a front affixing end rotatably coupled at a center of said steering board to enable said steering broad to be self-rotated at said center thereof, wherein said center of said steering board is aligned along said centerline of said supporting board.

4. The sled board, as recited in claim 3, wherein said supporting board has a convex front edge while said steering board has a concave rear edge spacedly aligned with said convex front edge of said supporting board to minimize a gap between said supporting board and said steering board.

5. The sled board, as recited in claim 4, wherein said supporting board has a seated portion indented on said top side thereof for allowing the rider sitting on said supporting board.

6. The sled board, as recited in claim 5, wherein said steering control further comprises two foot pedals spacedly provided at said top side of said steering board to rotate said steering board by foot operation.

7. The sled board, as recited in claim 5, wherein said steering control further comprises two controlling handles extended from said steering board for being gripped by the rider's hands to rotate said steering board by hand operation.

* * * * *